July 23, 1957

I. H. GERKS 2,800,583

MEANS FOR DETERMINING CROSS-CORRELATION
COEFFICIENTS, SUCH AS BETWEEN
DIVERSITY SIGNALS

Filed Oct. 21, 1955

INVENTOR.
IRVIN H. GERKS
BY Moody and Goldman
ATTORNEYS

July 23, 1957 I. H. GERKS 2,800,583
MEANS FOR DETERMINING CROSS-CORRELATION
COEFFICIENTS, SUCH AS BETWEEN
DIVERSITY SIGNALS
Filed Oct. 21, 1955 4 Sheets-Sheet 4

*INVENTOR.*
*IRVIN H. GERKS*

BY Moody and Goldman

*ATTORNEYS*

United States Patent Office 2,800,583
Patented July 23, 1957

2,800,583

MEANS FOR DETERMINING CROSS-CORRELATION COEFFICIENTS, SUCH AS BETWEEN DIVERSITY SIGNALS

Irvin H. Gerks, Cedar Rapids, Iowa, assignor to Collins Radio Company, Cedar Rapids, Iowa, a corporation of Iowa Application October 21, 1955, Serial No. 542,077

14 Claims. (Cl. 250—20)

This invention provides a means for determining the cross-correlation coefficient for a plurality of time-functions.

Generally, a cross-correlation coefficient is a measure of the degree that a pair of varying functions are "in-step" with each other. There is perfect correlation when two functions are exactly "in-step" with each other, as, for example, occurs when two functions instantaneously rise and fall together.

A complete lack of correlation exists when two functions are completely random with respect to each other; as, for example, where there is no relationship between the instantaneous rising and falling of two functions.

The cross-correlation coefficient is mathematically defined by the following equation:

$$K = \frac{\frac{1}{T}\int_0^T f_1(t)f_2(t)dt}{F_1 F_2} \quad (1)$$

where K is the cross-correlation coefficient, $f_1(t)$ is a first function of time, $f_2(t)$ is a second function of time, T is a particular period of time measured from a given reference point of time, $F_1$ is the root-mean-square value of $f_1(t)$, and $F_2$ is the root-mean-square value of $f_2(t)$. The root-mean-square value is defined as follows:

$$F = \sqrt{\frac{\int_0^T f^2(t)dt}{T}} \quad (2)$$

The cross-correlation coefficient, provided by Definition 1 above, may vary between zero and unity. However, the limiting unity value may be either positive or negative. A positive unity coefficient indicates that two functions instantaneously rise and fall together with the same instantaneous polarity. A negative unity coefficient indicates that two functions instantaneously rise and fall with opposite instantaneous polarity.

Figures 1 (A) and 1 (B) illustrate two pulsed waves that have a positive unity cross-correlation coefficient, and Figures 2 (A) and 2 (B) illustrate pulsed time functions that have a negative unity cross-correlation coefficient.

In nature, time-functions often are completely random with respect to each other; and in such case, their correlation is zero. For example, the thermal noises generated in two different resistors are random with respect to each other and, therefore, have a zero cross-correlation coefficient. Figures 3 (A) and 3 (B) illustrate two pulsed functions which are random with respect to each other and, accordingly, have a zero cross-correlation coefficient.

There are infinite degrees of correlation between zero and unity which may be used to specify the amount of randomness that exists between two time-varying functions which might, for example, be current and/or voltage functions of time.

A particular use for the cross-correlation coefficient is in the diversity reception of radio waves. In a diversity receiving system, a plurality of antennas are used to receive fading electromagnetic radiation. The antennas of such system may, for example, be used sequentially, whereby only the antenna receiving the strongest signal is used at any one time. The positions of the antennas must be chosen so that signal fading does not occur simultaneously at all antennas, that is, a unity positive correlation coefficient is very undesirable.

It has been found that signal fading at the various receiving antennas in a diversity system can be prevented from occurring simultaneously by properly positioning the antennas with respect to each other. Therefore, the correlation of signal fading at the respective antennas may, to a large extent, be controlled by the positions of the antennas.

If there is a unity positive cross-correlation coefficient between the fading functions of the radiation received by two diversity antennas, the two antennas will not be much more effective than a single antenna, since fading below the noise level will occur simultaneously at both antennas.

On the other hand, the most effective type of cross-correlation between fading functions at two diversity antennas is a negative unity coefficient, because then one antenna would be receiving its strongest signal, while the other antenna is receiving its weakest signal.

However, there is no way known at this time to position two diversity antennas in a manner that will obtain a negative unity coefficient between their fading functions. The best situation that can presently be obtained is a cross-correlation coefficient of zero, which occurs when there is complete randomness between the fading at two diversity antennas. It can be proven that when each of two antennas in a diversity receiving arrangement receives a signal that exceeds the minimum intelligible level 50 percent of the time, the diversity arrangement will provide an intelligible signal about 75 percent of the time, if their fading functions have a zero cross-correlation coefficient. If a positive cross-correlation coefficient exists, an intelligible output signal will be provided by the diversity system under the given condition somewhere between 50 percent and 75 percent of the time, as the cross-correlation coefficient varies from unity to zero, respectively.

The measurement of the cross-correlation between two differently fading signals has been extremely difficult, if not impossible, in some cases. This invention provides a relatively simple means for measuring the cross-correlation coefficient between a pair of time-varying electrical functions, which may be the fading output of the antennas in a diversity system.

It is, therefore, an object of this invention to provide a means for determining the cross-correlation coefficient between diversity antennas with much convenience, and in a very short period of time.

It is another object of this invention to provide a method for measuring the cross-correlation coefficient for almost any pair of varying functions of time that can be translated into terms of voltage or current.

It is a feature of this invention to provide a switching and integrating system of simple and economical construction to measure the cross-correlation coefficient between two pulsed functions of time, wherein the cross-correlation coefficient is indicated directly on a meter without calculation of any type being required by a person using the invention.

It is another feature of this invention to provide a system that can use either electromagnetic relays or fast acting electronic switching means to measure the cross-correlation coefficient between two electrical functions which are translated into pulsed functions.

Further objects, advantages and features of this invention will be apparent to a person skilled in the art upon further study of the specification and drawings, in which:

Figures 1 (A) and 1 (B) show a pair of pulsed waves having a positive unity cross-correlation coefficient;

Figures 2 (A) and 2 (B) show a pair of pulsed waves having a negative unity cross-correlation coefficient;

Figures 3 (A) and 3 (B) illustrate a pair of waves having a zero cross-correlation coefficient;

Figure 4:
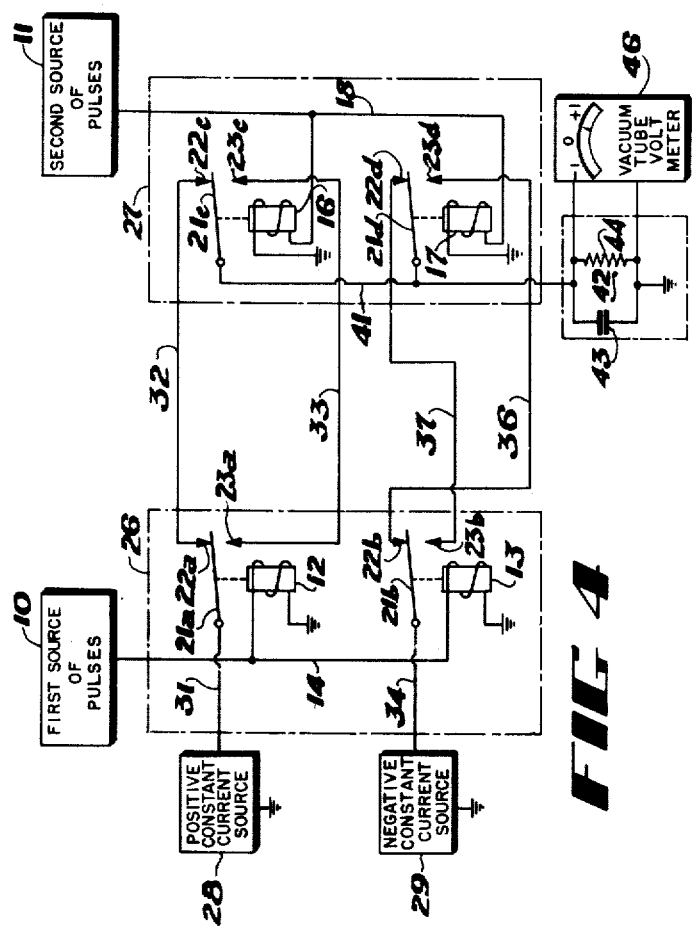
Figure 4 shows one form of the invention using electromagnetic switching means.

The form of the invention illustrated in Figure 4 determines the cross-correlation coefficient between a pair of pulsed functions. A first pulsed function is provided by a source 10 which provides a series of pulses having a wide range of variation in pulse-width and/or pulse-repetition-rate. Similarly, a second pulsed function is provided by a second source 11 which also provides pulses having a wide range of variation in pulse-width and/or pulse-repetition-rate.

A pair of relays 12 and 13 are connected between ground and a lead 14 that connects to first source 10. In a similar manner, another pair of relays 16 and 17 are connected between ground and a lead 18 that connects to second source 11. The relays may be identical, and each relay has a single pole and double-throw contacts; wherein relay 12 has pole 21a and contacts 22a and 23a, relay 13 has pole 21b and contacts 22b and 23b, relay 16 has pole 21c and contacts 22c and 23c, and relay 17 has pole 21d with contacts 22d and 23d.

Relays 12 and 13 comprise a first channel 26 (indicated by dashed lines) because they are actuated by first source 10; and the other pair of relays 16 and 17 provide a second channel 27 (also indicated by dashed lines) because these relays are actuated by second source 11.

A positive-constant-current source 28, which generates a constant unidirectional current, has its output connected by a lead 31 to pole 21a of relay 12. Another lead 32 connects relay contacts 22a and 22c; and, still another lead 33 connects the opposing relay contacts 23a and 23c.

In a similar manner, a negative-constant-current-source 29 generates a unidirectional current having an opposite polarity with respect to first current source 28 and with reference to ground. Both sources 28 and 29 provide currents of equal magnitude. A lead 34 connects the output of negative-current-source 29 to pole 21b of relay 13. Another lead 36 connects relay contact 22b of relay 13 to relay contact 23d of relay 17; and still another lead 37 connects relay contact 23b to relay contact 22d.

An output lead 41 connects to poles 21c and 21d and receives the output of the relay combination. An integrator circuit 42, which has one side grounded, is connected on its ungrounded side to output lead 41. The integrator circuit 42 may be comprised of a capacitor 43 in parallel with a resistor 44; and they should preferably have a time-constant that is long, as, for example, one minute. A voltmeter 46 having a very high input impedance, which may be a vacuum tube voltmeter, is connected across the integrator circuit.

The scale of meter 46 may be calibrated in terms of the cross-correlation coefficient, wherein zero is indicated at the scale's midpoint, plus-one is illustrated at one scale extreme, and minus-one is illustrated at the other scale extreme.

The relays should have equal pull-in and drop-out times, but where the periods of pulses are generally long with respect to the pull-in and drop-out times, slight inequality between pull-in and drop-out times will not cause substantial error.

The operation of the invention shown in Figure 4 may best be understood from some specific examples of operation. First, assume that a pair of pulsed waves having a perfect positive cross-correlation coefficient are to be analyzed, wherein first source 10 provides the output wave shown in Figure 1 (A) and second source 11 provides the output wave in Figure 1 (B). As stated above, these waves have a positive unity cross-correlation coefficient. The pulsed output waves of sources 10 and 11 may be in the form of interrupted direct voltage with zero voltage provided between pulses. Therefore, the relays will be actuated during each received pulse and will not be actuated between pulses. When the relays in Figure 4 are not energized, each pole 21 is in an upward position where it engages contact 22. Hence, contact 22 of each relay will be engaged between received pulses; and contact 23 of each relay will be engaged during a received pulse.

Accordingly, relays 12 and 13 of first channel 26 have their poles 21a and 21b actuated downwardly in Figure 4 in response to the pulses from first source 10; and poles 21c and 21d of the other relays 16 and 17 are actuated downwardly in response to the pulses from second source 11.

Figure 1:
Figure 1:

When the identical wave-forms of Figures 1 (A) and 1 (B) are provided by sources 10 and 11, it will be noted that all four relays will operate in unison. In such case, a current circuit is provided only from the positive current-source 28 to integrator circuit 42. Thus, when poles 21 are all in an upward postion, a current path is provided from positive-source 28 through pole 21a, contact 22a, lead 32, contact 22c, pole 21c, and output lead 41 to integrator circuit 42. On the other hand, when the relays are all in a downward position in Figure 4, it will be noted that a current path is provided from positive-source 28 through pole 21a, contact 23a, lead 33, contact 23c, pole 21c, and output lead 41 to integrator circuit 42.

While the relays are all switching in unison, there is no current provided to integrator circuit 42 from the negative source 29. Thus, when the poles are all in an upward position in Figure 4, negative-current-source 29 sees an open circuit at contact 23d; and when all of the poles are in a downward position, negative-current-source 29 sees an open circuit at contact 22d.

Consequently, the waves of Figures 1 (A) and 1 (B) will cause integrator circuit 42 to be charged continually and only by positive-current-source 28, except during the relay switching time, which is negligible when the pulses have relatively long periods. As a result, the integrator circuit will charge to a maximum positive voltage which will be indicated on the scale of voltmeter 46 by the number, plus-one, to indicate a positive unity cross-correlation coefficient.

Figure 2:
Figure 2:

Another example of the operation of the invention in Figure 4 will assume that a pair of waves, having a negative unity cross-correlation coefficient, are to be analyzed; wherein first source 10 provides the wave shown in Figure 2 (A) and second source 11 provides the wave shown in Figure 2 (B). As stated above, these waves have a negative unity cross-correlation coefficient. In this particular situation, the relays of first channel 26 will be actuated in an opposing manner from the relays of second channel 27. Accordingly, poles 21a and 21b of first channel 26 will be in an upward position in Figure 4, at the instant that poles 21c and 21d of second channel 27 will be in a downward position, and vice-versa. Consequently, a current path will be provided only from negative-current-source 29 to integrator circuit 42. Now, positive-current-source 28 will continually see an open circuit.

A circuit is thus provided from negative-current-source 29 either: through pole 21b, contact 22b, lead 36, contact 23d, pole 21d to output lead 41 and integrator circuit 42; or through pole 21b, contact 23b, lead 37, contact 22d, pole 21d to output lead 41 and integrator circuit 42.

Then, integrator circuit 42 is charged by a continuous flow of negative current, except during switching time, and attains a maximum negative voltage across it to indicate on meter 46 another scale extreme, which is calibrated by the figure, minus-one, to indicate a negative unity cross-correlation coefficient.

Figure 3:
Figure 3:

A third example assumes no correlation between the waves from first source 10 and second source 11. For example, first source 10 may provide the wave shown in Figure 3 (A) and second source 11 may provide the uncorrelated wave shown in Figure 3 (B). Complete randomness is assumed between these waves; and where there is complete randomness between a pair of waves over a long period of time, their cross-correlation coefficient is zero.

When a pair of waves are completely random with respect to each other, the relays of first channel 26 will be actuated in a completely random manner with respect to actuation of the relays in second channel 27. It is a characteristic of complete randomness over a long period of time that the pair of waves will instantaneously be in-step with each other one-half of the time and will instantaneously be out-of-step with each other the other one-half of the time. This is a totalized characteristic, and there is, of course, no way of knowing when the waves are instantaneously in-step or out-of-step with each other. This is accordingly assumed to be a property of the waves shown in Figures 3 (A) and 3 (B). As a result, over a long period of time, negative current will flow into integrator circuit 42 one-half of the time; and positive current will flow into integrator circuit 42 the other one-half of the time to provide a net zero charge on integrator circuit 42.

Hence, zero voltage will be indicated by voltmeter 46, and its needle will point to the zero mark on its scale, which corresponds to a zero cross-correlation coefficient.

Where there is some degree of cross-correlation between the signals, positive and negative currents will flow for different total amounts of time over a relatively long period of time; and the integrator circuit will obtain a charge other than zero that is proportional to the cross-correlation coefficient. Thus, the integrator circuit is charged to a voltage that is directly proportional to the cross-correlation coefficient of the input signals, and a meter indication directly indicates the cross-correlation coefficient.

The invention, in effect, provides a computing circuit which solves Equation (1) above, wherein a multiplication occurs through the series connected poles actuated by the two pulsed wave functions. Multiplication occurs in the relay circuit between digits of unity; and the mathematical sign of the unity digits is provided by the opposite polarity current sources 28 and 29.

Furthermore, the invention inherently reduces each function to a root-mean-square value of one, thereby reducing the denominator of Equation 1 above to unity. This is not readily apparent but may be explained as follows: Although, the pulses provided from sources 10 and 11 may be an interrupted direct current, in order to actuate the relays, it will be noted that the motion of a relay pole occurs first in one direction and then in the other direction in an alternating manner which has no regard to any unidirectional component received by the relay electromagnet. Thus, the pole of each relay only sees the alternating component of the pulsed wave provided to the relay. As a result, relay pole actuation may be represented by a wave of the type shown in any of the Figures 1 (A) through 3 (B), wherein each wave operates about its alternating axis 48.

The amplitude of the pole-actuated alternating wave is arbitrarily chosen as unity. Hence, the root-mean-square value of the wave must be unity. In this manner, it may be realized that first channel 26 is actuated by a wave that has a unity root-mean-square value, which is $F_1$ in Equation 1 above; and similarly, second channel 27 is actuated by a wave that also has a unity root-mean-square value, which is $F_2$ in Equation 1 above. While this explanation may be difficult to see, it has been proven by experimental results.

Therefore, the system of relays operates as a multiplier of a pair of unity factors, which may have any combination of positive and/or negative signs. For example, where one source provides a pulse amplitude of plus-one, and the other source provides a pulse amplitude of minus-one at the same instant, the relay combination will connect only negative-current-source 29 to integrator circuit 42 to provide an output of minus-one at that instant. On the other hand, where both sources provide pulses with an amplitude of minus-one at the same instant, the relay combination will connect only positive-current-source 28 to integrator circuit 42 to provide an output of plus-one at that instant. And where both sources provide pulses with an amplitude of plus-one at the same instant, the relay combination will connect only positive-current-source 28 to integrator circuit 42 to provide an output of plus-one at that instant. These multiplications will be observed in the examples given above.

Integrator circuit 42 provides integration of the product output of the relay circuitry over a period, T, that is dependent upon the time-constant of integrator circuit 42. The proportionality constant, $1/T$, is accounted for in the calibration of the scale of voltmeter 46.

Figure 5:
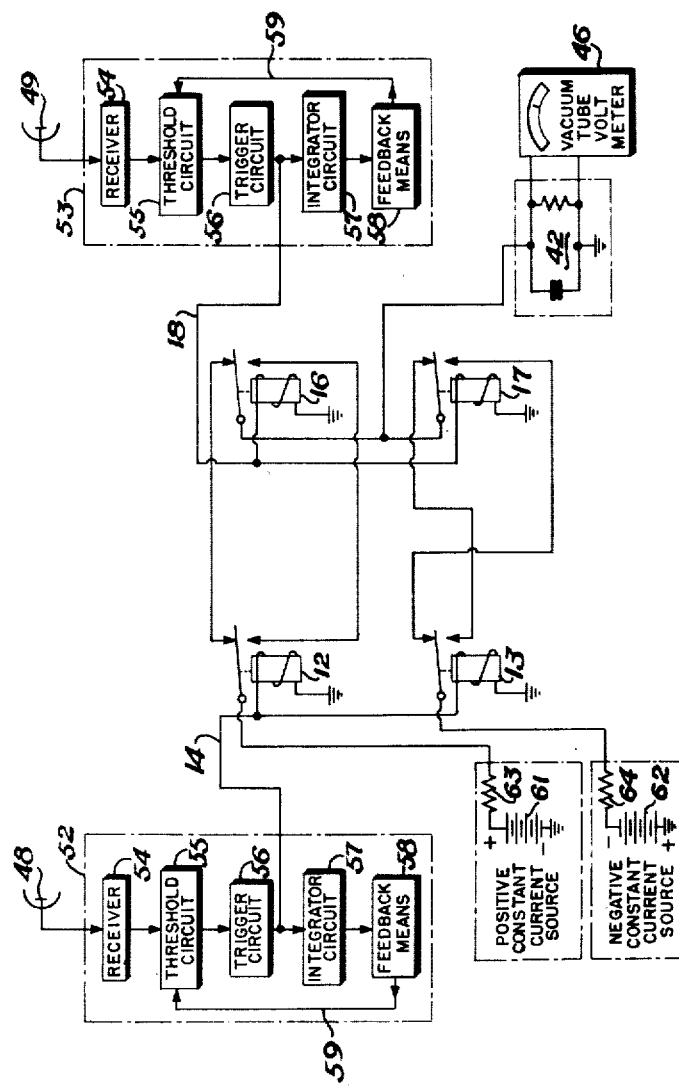
Figure 5 shows a function translation system that may be used in the invention.

Figure 5 shows a particular form of the invention for determining the cross-correlation coefficient of two functions which are continuously varying functions rather than pulsed functions. An example of two such functions is the fading occurring at two antennas used in a diversity receiving system. The antennas are 48 and 49, which may be located with respect to each other at given positions for reception of a radiated wave.

Since the fading function at an antenna is not a pulsed function, it, therefore, cannot be directly used as the input to the relay combination, as described in connection with Figure 4. A pair of wave-translation-means 52 and 53 are provided to translate the respective continuously varying functions into pulsed functions in a manner that obtains substantial correlation between the respective varying input function and its corresponding pulsed output function. In Figure 5, wave-translation-means 52 and 53 each transform a fading function into a pulsed function by selecting the median value of the fading function and by providing a positive pulse for each period that the fading function exceeds the median value and by providing a negative pulse during each period that the fading function is below the median level. The median value of the fading wave is the amplitude level that is exceeded by the wave 50 percent of the time.

The detailed construction of wave-translation-means 52 and 53 used herein is described and claimed in patent application, Serial No. 368,923, filed July 20, 1953, titled "Amplitude Distribution Analyzer" to Irvin H. Gerks.

Briefly, each wave-translation-means has a receiver 54 with the receiver input connected to the adjacent antenna. Receiver 54 amplifies and detects the fading carrier-component of the received wave. Thus, receiver 54 provides a direct-current output which varies in proportion to the fading of the radiation signal received by its antenna.

A threshold circuit 55 receives the output of receiver 54 and clips the varying direct-current output at a voltage level that corresponds to the signal level which is exceeded 50 percent of the time. The signal level that is exceeded 50 percent of the time is the median level of the signal; and automatic computing circuitry within the translation-means maintains the threshold level at the 50 percent exceeded value.

A trigger circuit 56 receives the clipped output of the threshold circuit and provides a pulsed output, wherein a pulse of constant amplitude is provided for the period of each clipped portion of the fading function. The pulses are, in effect, chopped direct-current and have a pulse-width and a pulse-repetition-rate that varies directly with the continuously varying input signal. These pulses are provided to an integrator circuit 57, which has a relatively large time-constant, which might be 30 minutes, and, accordingly, sums the pulses over a relatively long period of time. Due to the constant amplitude trigger circuit output, integrator circuit 57 provides a direct-voltage output proportional to the percentage of time that the input signal exceeds the clipping level in threshold circuit 55; and a predetermined value of direct-voltage output will correspond to the 50 percent exceeded level and is used for comparison. When a different direct-voltage output occurs from integrator circuit 57, a feedback means 58 provides an error-voltage that readjusts threshold circuit back to the 50 percent exceeded level by feedback 59. Thus, a servo system is provided that maintains the threshold circuit at the 50 percent exceeded level. Feedback 59 may be either mechanical or electrical.

A similar analysis holds for the other wave-translation-means 53 which similarly provides a pulsed output with the fading signal received from antenna 49.

It is noted here that wave-translation-means 52 may be one form of first-pulse-source 10 in Figure 4, and that the other wave-translation-means 53 may be one form of second-pulse-source 11.

The relay computing system in Figure 5 may be identical to the relay system described in connection with Figure 4. Also, its positive and negative current sources may be identical and, for example, might be batteries 61 and 62, respectively, connected in series with resistors 63 and 64 having a very high resistance value. Of course, in a practical case, rectifier circuits will generally be used to provide the current sources; and since this is obvious to a person skilled in the art, such sources will not be described here.

Electro-mechanical relays are adequate for many applications where the pulse-repetition-rate is not extremely high. For example, radio signal fading at around 1000 megacycles occurs, beyond the horizon, at a sufficiently slow rating to readily permit the use of the relay system described. However, where very high switching speeds are required, electronic switching means may become essential.

Figure 6:
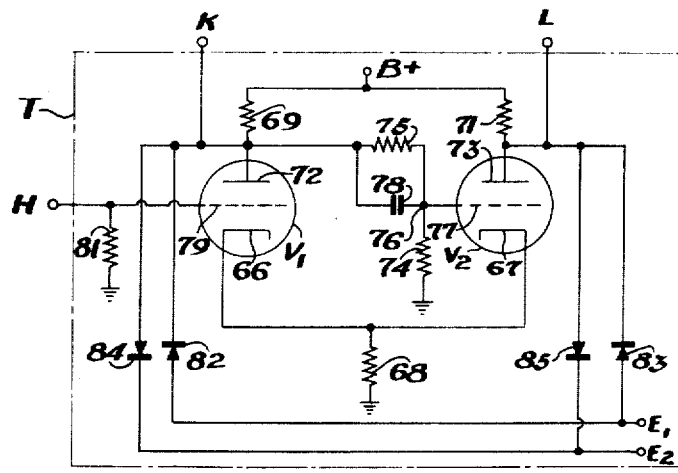
Figure 6 is a schematic diagram of an electronic switch having clamped outputs; and, Figure 7 illustrates another form of the invention using a plurality of electronic switches of the type shown in Figure 6.

Figure 6 shows one type of electronic switching means T that may be used in the invention. Other types of multivibrator and transistor switching circuits may also be used and will become apparent after an understanding is obtained of this invention.

Figure 7:
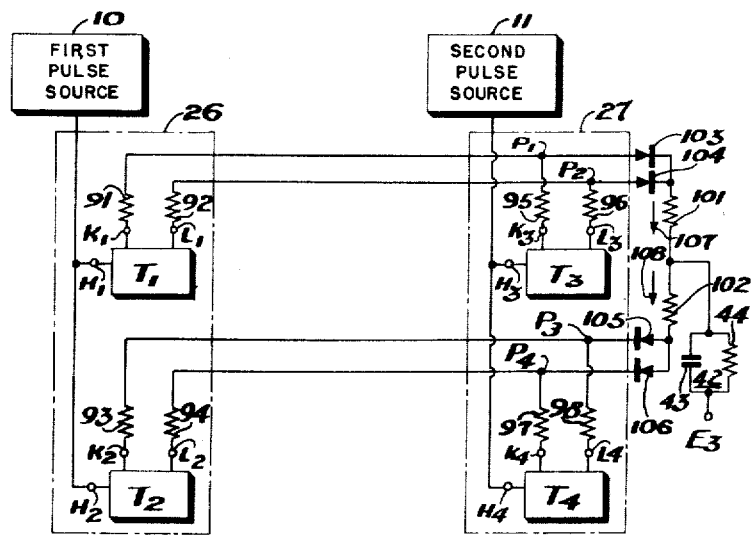

Figure 6 shows a clamped type of trigger circuit T that might be used in the form of the invention shown in Figure 7, which uses electronic switching means rather than the relays used in Figures 4 and 5.

Trigger circuit T in Figure 6 includes a pair of tubes $V_1$ and $V_2$ that have their cathodes 66 and 67 connected to one side of a cathode resistor 68, which has its other end grounded. A B-plus source is connected through plate resistors 69 and 71, to the plates 72 and 73 of the tubes.

A pair of resistors 74 and 75 are connected in series between ground and plate 72 of tube $V_1$. The common point 76 between these resistors connects to the grid 77 of tube $V_2$, and a capacitor 78 is connected across resistor 75. Resistors 74 and 75 form a voltage-divider which normally maintains tube $V_2$ in a conducting state. The plate current of tube $V_2$ passes through the cathode resistor 68 and normally maintains tube $V_1$ in a nonconducting state. The grid 79 of tube $V_1$ is grounded through a grid-leak resistor 81. The input to trigger circuit T is received at terminal H, which connects to grid 79 of tube $V_1$. A pair of outputs K and L are received at terminals K and L that connect to the plates of tubes $V_1$ and $V_2$, respectively.

Output K will have the same form as an input pulsed signal received at input terminal H, and output L will be reversed in form from the input signal due to the reversed conduction states of tubes $V_1$ and $V_2$.

It is essential for proper operation of trigger circuit T that the amplitude of the output wave be stabilized to predetermined constant values, which may be direct-voltages $E_1$ and $E_2$, where $E_1$ is somewhat larger than the normal minimum plate voltage for tubes $V_1$ and $V_2$ when they conduct, and $E_2$ is somewhat smaller than the normal maximum plate voltage for tubes $V_1$ and $V_2$ when they are non-conducting. Consequently, a pair of diodes 82 and 83 having the polarity shown in Figure 6 are connected between direct-voltage $E_1$ and the respective plates of tubes $V_1$ and $V_2$. Similarly, another pair of diodes 84 and 85 are connected with the opposite polarity shown in Figure 6 between direct-voltage $E_2$ and the respective plates of tubes $V_1$ and $V_2$.

The invention in Figure 7 uses four trigger circuits $T_1$, $T_2$, $T_3$ and $T_4$, each identical to the type shown in Figure 6. Trigger circuits $T_1$ and $T_2$ comprise first channel 26 and have their inputs $H_1$ and $H_2$ connected to first pulsed source 10, as was used in Figure 4; while the other trigger circuits $T_3$ and $T_4$ comprise second channel 27 and have their inputs $H_3$ and $H_4$ connected to second pulsed source 11.

A plurality of equal resistors, 91, 92, 93, 94, 95, 96, 97 and 98 are respectively connected at one end to the output terminals K and L of the four trigger circuits as shown in Figure 7. Resistors 91 and 95 connect together at point $P_1$; resistors 92 and 96 connect together at point $P_2$; resistors 93 and 98 connect together at point $P_3$; and, resistors 94 and 97 connect together at point $P_4$.

Integrator circuit 42, having a large time-constant, is connected on one side to a direct-voltage source $E_3$. Voltage $E_3$ has a value midway between direct-voltages $E_1$ and $E_2$, which are applied to each of the trigger circuits in Figure 7, although not shown in Figure 7 since they were explained in connection with Figure 6.

Other resistors 101 and 102 are connected together at one of their ends, which are also connected to the side of integrator circuit 42 opposite to its connection to voltage $E_3$. A first diode 103 is connected on one side to point $P_1$, and a second diode 104 is connected on one side to point $P_2$; and these diodes connect together on their opposite sides to the remaining end of resistor 101. A third diode 105 connects on one side to point $P_3$; and a fourth diode 106 connects on one side to point $P_4$. Diodes 105 and 106 connect together on their other sides, which also connect to the remaining end of resistor 102. The diodes are arranged with the polarity shown in Figure 7, wherein first and second diodes 103 and 104 only permit current flow 107, which charges integrator circuit 42; while diodes 105 and 106 only permit current flow 108, which discharges integrator circuit 42.

Since tube $V_2$ in each trigger circuit is normally conducting, the voltage at output point L of each trigger circuit will normally be at the low value of voltage $E_1$; while the output voltage at terminals K will normally be at the high value of voltage $E_2$.

It is noted that the pairs of resistors connecting to points $P_1$, $P_2$, $P_3$ and $P_4$, respectively form four separate voltage-dividers.

The circuit of Figure 7 operates in a manner similar to the circuit of Figure 4. For example, if it is assumed that first and second pulsed sources 10 and 11 provide the correlated waves shown in Figures 1 (A) and 1 (B), integrator circuit 42 will charge toward but will never reach a high voltage of ($E_2 - E_3$). This charge corresponds to a positive unity cross-correlation coefficient and will be a small fraction of the voltage ($E_2 - E_3$). Thus, the positive cross-correlation coefficient may be indicated at one limiting point on the calibrated scale of a connected voltmeter. This may be explained as follows:

The inputs H to trigger circuits $T_1$, $T_2$, $T_3$ and $T_4$ are actuated in unison by the waves of Figures 1 (A) and 1 (B). Accordingly, at any instant, the output voltages at points $K_1$, $K_2$, $K_3$ and $K_4$ are equal (being either $E_1$ or $E_2$); and in an opposite manner, the output voltages at points $L_1$, $L_2$, $L_3$ and $L_4$ are equal (being either $E_2$ or $E_1$). Consequently, opposite voltages will exist at the ends of the voltage-dividers containing points $P_3$ and $P_4$; and the voltages at points $P_3$ and $P_4$ will be equal to voltage $E_3$ which is midway between the voltages of $E_1$ and $E_2$. As a result no conduction occurs through either of the diodes 105 or 106 to discharge integrator circuit 43.

On the other hand, point $P_1$ is at the potential of points $K_1$ and $K_3$, while point $P_2$ is at the potential of points $L_1$ and $L_3$. Since at any instant either points K or L are at high voltage $E_2$, conduction will occur through either diode 103 or 104 to charge integrator circuit 42. As a result, current flows continuously to integrator circuit 42 both during a pulse and between pulses in a sequential manner from points $P_1$ and $P_2$ while the input waves have a positive unity cross-correlation coefficient.

It is, therefore, apparent that integrator circuit 42 will charge to maximum voltage which is defined by the following formula:

$$E_u = \frac{R_{44}}{R_{44}+R_{101}}(E_2-E_3) \qquad (3)$$

Where $E_u$ is one extreme charged voltage provided across integrator circuit 42, and $R_{44}$ and $R_{101}$ are the respective resistances of resistors 44 and 101. Voltage $E_u$ may be indicated on a calibrated meter by the figure, plus-one, which corresponds to a unity positive cross-correlation coefficient.

On the other hand, when pulse sources 10 and 11 provide the respective waves of Figures 2 (A) and 2 (B), which have a negative cross-correlation coefficient, current will flow only through resistor 102 and will not flow through the other resistor 101. Consequently, integrator circuit 42 will discharge toward but will never reach another extreme voltage ($E_3-E_1$) which has opposite polarity with respect to the voltage in the positive correlated case, because diodes 105 and 106 are reversed in polarity from diodes 103 and 104. Consequently, another limiting voltage level is defined by the following formula:

$$E_L = \frac{R_{44}}{R_{44}+R_{102}}(E_3-E_1) \qquad (4)$$

Where $E_L$ is the other extreme charged voltage provided across integrator circuit 42, and $R_{44}$ and $R_{101}$ are the respective resistances of resistors 44 and 102. Voltage $E_L$ may be indicated on a calibrated meter by the figure, minus-one, which corresponds to a unity negative cross-correlation coefficient.

Negative perfect cross-correlation requires alternate reception of pulses by channels 26 and 27. Thus, channel 26 receives a pulse while channel 27 is between pulses, and vice-versa. Hence, at any particular instant, there is equal potential (either $E_1$ or $E_2$) on terminals $K_1$, $K_2$, $L_3$ and $L_4$; and likewise there is equal potential (either $E_2$ or $E_1$) on terminals $L_1$, $L_2$, $K_3$ and $K_4$. It is, therefore, noted that the voltage-dividers including points $P_1$ and $P_2$ have opposite voltage ($E_1$ and $E_2$) at their ends; and points $P_1$ and $P_2$ are at voltage $E_3$ so that no conduction can occur through the diodes 103 or 104 to affect integrator circuit 42.

On the other hand, the same voltage will exist at each instant on ends of the voltage-dividers containing points $P_3$ and $P_4$; and these points will switch between the extreme voltages $E_1$ and $E_2$ to discharge integrator circuit 42 toward one of the voltage levels defined by Formulas 3 and 4 above. The polarity of diodes 105 and 106 only permits a discharge current to flow. Consequently, a calibrated voltmeter connected to integrator circuit 42 will indicate a negative unity cross-correlation coefficient.

When a zero cross-correlation coefficient exists between the waves from first and second sources 10 and 11, then current will flow from points $P_1$ and $P_2$ into integrator circuit 42 one-half of the time and will flow to points $P_3$ and $P_4$ out of integrator circuit 42 one-half of the time over a long period of time; and as a result, integrator circuit 42 will not become charged or discharged. Thus, a voltemeter connected from the top of integrator circuit 42 to ground may be calibrated so that the point on its scale corresponding to voltage $E_3$ will indicate a zero cross-correlation coefficient.

The first and second pulsed sources 10 and 11 may be wave translation means of the type described in Figure 5.

The resistors 101 and 102 are current-limiting resistors which are similar in purpose to resistors 63 and 64 and which maintain substantially constant-current flow from points $P_1$, $P_2$, $P_3$ or $P_4$ into integrator circuit 42. The constant-current is further obtained by making the extreme charged voltages on the integrator circuit small compared to the charging voltages provided at points $P_1$ through $P_4$.

Resistors 101 and 102 will generally be equal and will have a much larger resistance than resistor 44, in order to maintain the extreme charged voltages of the integrator circuit small compared to the charging voltages, and also, in order to prevent undesirable back discharge of the integrator circuit through resistor 102 when it is positively charged and points $P_3$ and $P_4$ are at a voltage equal to $E_3$.

When substantially constant-current flow is maintained into the integrator circuit, a substantially linear proportionality is maintained between the cross-correlation coefficient and the charged voltage of the integrator circuit, which simplifies voltmeter calibration. If the charged voltage is a large fraction of the charging voltage, linear proportionality is not obtained and voltmeter calibration becomes more difficult.

It is possible to eliminate resistors 101 and 102 by making the resistance of each resistor 91 through 98 correspondingly large; however, this may cause difficulty in the selection of proper diodes 103 through 106.

While particular forms of the invention have been described in this application, it is understood that many forms of the invention will be obvious to persons skilled in the art, based on the teachings of this disclosure and, therefore, are comprehended within the scope of the following claims.

What is claimed is:

1. Means for determining the cross-correlation coefficient between a pair of pulsed signals comprising a first channel including a first pair of switching means, a second channel including a second pair of switching means, each of said switching means providing single-pole double-throw switching connections that connect a pair of outputs alternately in response to the amplitude variation of one of said pulsed signals, said first pair of switching means actuated by the first of said pulsed signals, said second pair of switching means actuated by the second of said pulsed signals, first current means connected serially with one of said first pair of switching means, second current means connected serially with the other of said first pair of switching means, one of said second pair of switching means having its switched outputs connected in a given order to the switched outputs of the first of said first pair of switching means, the switched outputs of the other of said second pair of switching means connected in opposite order to the switched outputs of the other of said first pair of switching means, an integrator circuit connected to each of said second pair of switching means, wherein the charge on said integrator circuit varies with the cross-correlation coefficient between said pair of pulsed signals.

2. Means for determining the cross-correlation coefficient between a pair of pulsed waves, comprising first, second, third, and fourth switching means, means for actuating said first and second switching means by one of said pulsed waves, means for actuating said third and fourth switching means by the other of said pulsed waves, each of said switching means providing a pair of oppositely varying current outputs, with each output having one current level corresponding to pulse peaks, and another current level corresponding to periods between pulses, an integrator circuit, said first and third switching means having their outputs connected together in a given order and to the input of said integrator circuit, said second and fourth switching means having their outputs connected oppositely from said given order and to the input of said integrator circuit, whereby said integrator circuit is charged to a current level proportional to the cross-correlation coefficient between said pulsed input waves.

3. Means for determining the cross-correlation coefficient between first and second pulsed waves, comprising first, second, third, and fourth switching means, each of said switching means having first and second outputs capable of alternate actuation between two fixed voltage levels, means for connecting said first and second switching means to said first pulsed wave for alternate actuation of said switching means outputs by said first wave, second means for connecting said third and fourth switching means to said second pulsed wave for alternate actuation of said switching means outputs by said second wave, an integrator circuit comprising a capacitor and a resistor connected in parallel, said first and second outputs of said first and third switching means connected respectively, said third switching means connected to the input of said integrator circuit, the second switching means having its first and second outputs connected respectively to the second and first outputs of said fourth switching means, said fourth switching means connected to the input of said integrator circuit, whereby said integrator circuit is charged to a voltage level that varies with the cross-correlation coefficient of said pair of pulsed waves.

4. Means for determining the cross-correlation coefficient between a pair of pulsed input waves comprising, first, second, third, and fourth electromagnetic relays, each of said relays having at least a single-pole, and double-throw contacts engaged by said pole, means for connecting said first and second relays for actuation by said first pulsed wave, means for connecting said third and fourth relays for actuation by said second pulsed wave, each of said relays having its pole engaging its first contact when said relay receives a pulse and engaging its second contact when the input wave is between pulses, a first current source connected to the pole of said first relay to provide a first current level, a second current source connected to the pole of said second relay to provide a second current level, the first contact of said third relay connected to the first contact of said first relay, the second contact of said third relay connected to the second contact of said first relay, the first contact of said fourth relay connected to the second contact of said second relay, and the second contact of said fourth relay connected to the first contact of said second relay, an integrator circuit having its input connected to the poles of said third and fourth relays to receive any current outputs provided by said poles, whereby said integrator circuit is charged to a voltage level which varies with the cross-correlation coefficient between said pulsed input waves.

5. Means for determining the cross-correlation coefficient between first and second input waves, comprising first means for translating said first input wave into a correlated first pulsed wave, second means for translating said second input wave into a correlated second pulsed wave, first, second, third, and fourth switching means, each switching means providing first and second outputs, said first and second outputs capable of alternating between two different voltage levels, first means for connecting said first and second switching means to said first wave translating means to alternately actuate the respective outputs of said first and second switching means in response to the pulsed output of said first wave translating means, a second means for connecting said third and fourth switching means to said second wave translating means to alternately actuate the respective outputs of said third and fourth switching means in response to the pulsed output of said second wave translating means, the first and second outputs of said first and third switching means connected respectively in series, the first and second outputs of said second and fourth switching means serially connected in reverse order, an integrator circuit having its input connected to the outputs of both of said third and fourth switching means, whereby said integrator is charged to a voltage level that varies with the cross-correlation coefficient between said input waves.

6. Means for determining the cross-correlation coefficient between first and second pulsed waves, comprising first, second, third, and fourth switching means, each switching means having first, second, and third terminal means, with said first terminal means alternately connectable to said second and third terminal means, first and second actuating means for actuating respectively the alternate connections of said first and second switching means in response to said first pulsed wave, third and fourth actuating means for actuating the alternate connections of said third and fourth switching means in response to said second pulsed wave, a first substantially constant current source connected to the first terminal means of said first switching means, a second substantially constant current source connected to the first terminal means of said second switching means, the second and third terminal means of said first and third switching means connected respectively, the second and third connections of said second and fourth switching means connected in reverse order, and an integrator circuit having its output connected to the first terminal means of each of said third and fourth switching means to receive a charge that varies with the cross-correlation coefficient of said pulsed waves.

7. Means for determining the cross-correlation coefficient between a pair of pulsed waves comprising first, second, third and fourth switching means, each of said switching means having first, second and third terminal means, each second and third terminal means each providing an output that is alternately variable between two fixed voltage levels, first means for connecting said first and second switching means to said first pulsed wave for alternate actuation of their respective second and third terminal means in unison with said first pulsed wave, second means for connecting said third and fourth switching means to said second pulsed wave for alternate actuation of their respective second and third terminal means in unison with said second pulsed wave, an integrator circuit comprising a capacitor and a resistor connected in parallel, the second and third terminal means of each of said first and third switching means connected respectively, the first terminal means of said third switching means connected in series with the input of said integrator circuit, the second and third terminal means of each of said second and fourth switching means respectively connected in reverse order, the first terminal means of said fourth switching means connected in series with the input of said integrator circuit, whereby said integrator circuit receives a charge that varies with the cross-correslation coefficient of said pulsed waves.

8. Means for determining the cross-correlation coefficient between first and second fading radiation waves received by a pair of respective antennas, comprising a first wave translating means receiving the fading output of said first antenna to provide a pulsed output that correlates with said first fading wave, and a second wave translating means receiving the output of said other antenna to provide a pulsed output that correlates with the second fading wave, each of said wave translating means including a receiver, a threshold circuit, a trigger circuit, an integrator circuit, and feedback means connected in tandem, with the output of said feedback means connected to said threshold circuit to maintain the integrator circuit output at its median level, the pulsed output from each wave translating means taken at the output of said trigger circuit; first, second, third, and fourth switching means, each of said switching means having alternately actuable first and second outputs, each varying between two fixed voltage levels; means for actuating said first and second switching means in response to the pulsed output of said first wave translating means, means for actuating said third and fourth switching means in response to the pulsed output of said second wave translation means, the first and second outputs of each of said first and third switching means being connected respectively, the first and second outputs of each of said second and fourth switching means being connected in reverse order, an output integrator circuit having a long time constant, with one side connected in series with said third and fourth switching means, a potential between the fixed voltage levels of said switching means connected to the other side of said integrator circuit, and high input impedance voltage indicating means connected across said integrator circuit to indicate the variation of the cross-correlation coefficient between the fading radiation waves of said antennas.

9. Means for determining the cross-correlation coefficient between the fading output signals of first and second antennas, comprising first and second wave-translation means for translating respectively each of said fading signals into a correlated pulsed wave; first, second, third and fourth electromagnetic relay means, each having an electromagnetic coil, and at least a single pole, and double-throw contacts, with the coil actuating the pole, said first and second relays having their coils connected in parallel between ground and the output of said first wave-translating means, said third and fourth relays having their coils connected in parallel between ground and the output of said second wave-translating means, a positive constant-current source connected between ground and the pole of said first relay, a negative constant-current source connected between ground and the pole of said second relay, said first and third relays having the first of their pairs of contacts connected together and the second of their pairs of contacts also connected together, said second and fourth relays having their contacts connected in the reverse order of the contact connection of said first and third relays, output integrator means comprising a capacitor and a resistor connected in parallel between ground and the poles of said third and fourth relays, and high input-impedance voltage indicating means connected across said integrator circuit, whereby said indicating means indicates a voltage that varies with the cross-correlation coefficient of said first and second antenna fading functions.

10. A cross-correlation coefficient determining means as in claim 9 wherein each of said wave translation means comprises, means for receiving and amplifying and detecting the fading output of one of said antennas, threshold-circuit means for receiving the detected output of said receiving means and for varying the direct-voltage component of the detected output, trigger-circuit means for receiving the output of said threshold-circuit means and for providing a pulse for each period that the threshold-circuit means input exceeds a predetermined threshold level, the pulsed output of said trigger-circuit means having a given amplitude, an integrator circuit having a relatively long time-constant connected to the pulsed output of said trigger circuit, feedback means connected to said integrator circuit to provide an output that is the difference between the actual integrator voltage and fifty percent of the maximum integrator voltage, and said feedback means having its output connected to and said threshold-circuit means to regulate the threshold level to maintain said integrator circuit charged substantially at the voltage which is fifty percent of the maximum voltage, and the output of said wave-translating means being the pulsed output of said trigger-circuit means.

11. Means for determining the cross-correlation coefficient between a pair of pulsed waves comprising first, second, third and fourth trigger circuits, each trigger circuit providing first and second outputs, each output having two output voltage levels wherein the first and second outputs are always at opposite levels, means for connecting the inputs of said first and second trigger circuits to receive one of said pulsed waves, means for connecting the inputs of said third and fourth trigger circuits to receive said other pulsed wave, four pairs of resistors with each pair associated with a different trigger circuit, the resistors of each pair having one end respectively connected to the first and second outputs of the associated trigger circuit, an integrator circuit comprising a resistor and a capacitor connected in parallel, a first diode connected serially between said integrator circuit and the remaining ends of the first of said pairs of resistors connected to said first and third trigger circuits, a second diode connected serially between said integrator circuit and the remaining ends of the second of said pairs of resistors connected to said first and third trigger circuits, a third diode connected serially between said integrator circuit and the remaining ends of the first resistor of said pair connected to said second trigger circuit and of the second resistor of said pair connected to said fourth trigger circuit, a fourth diode connected serially between said integrator circuit and the remaining ends of the second resistor of said pair connected to said second trigger circuit and of the first resistor of said pair connected to said fourth trigger circuit, said third and fourth diodes connected with opposite polarity from said first and second diodes with respect to said integrator circuit, whereby the voltage of said integrator circuit varies with the cross-correlation coefficient of said pulsed waves.

12. A cross-correlation coefficient determining means as in claim 11 wherein each trigger circuit comprises first and second electron tubes each having at least three electrodes including a control electrode, the control electrode of said first electron tube receiving the respective pulsed input, resistance means connected between ground and the cathode electrodes of both of said electron tubes, first plate resistance means connected between the plate electrode of said first electron tube and a plate supply voltage, second plate resistance means connected between the plate electrode of said second electron tube and the plate supply voltage, a first direct-voltage clamping source having a voltage less than the non-conducting plate voltage of said electron tubes, a second direct-voltage clamping source having a voltage greater than the conducting plate voltage of said electron tubes, first and second diodes connected at one end to the plate electrode of said first electron tube, third and fourth diodes connected at one end to the plate electrode of said second electron tube, said first and third diodes connected at their opposite ends to said first clamping source, said second and fourth diodes connected at their opposite ends to said second clamping source, the diodes connected to said second clamping source arranged with an operable polarity that is opposite from the diodes connected to said first clamping source, a pair of resistors connected serially between ground and the plate electrode of said first electron tube, the control electrode of said second electron tube connected to the intermediate point between said pair of serially connected resistors, and a capacitor connected between said intermediate point and the plate electrode of said first electron tube, and said trigger circuit providing respective outputs from the plate electrodes of its electron tubes.

13. Means for determining the cross-correlation coefficient between first and second pulsed input waves comprising first, second, third, and fourth pulse-amplifying means, means for connecting the inputs of said first and second pulse-amplifying means to receive said first pulsed wave, means for connecting the inputs of said third and fourth pulse-amplifying means to receive said second pulsed wave, each amplifying means providing first and second output pulsed waves having each peak and base levels clamped to predetermined voltage levels, and the first and second outputs of each of said amplifying means see-sawing between the two clamped voltage levels, an integrator circuit comprising a capacitor and a resistor connected in parallel and having a long time constant, a direct-voltage source providing a voltage between the clamped voltage levels and connected to one side of said integrator circuit; first, second, third and fourth diodes connected serially with the other side of said integrator circuit, wherein said first and second diodes are connected with a polarity opposite from said third and fourth diodes with respect to said integrator circuit, said first diode connected serially with both first outputs of said first and third pulse amplifying circuits, said second diode connected serially with both second outputs of said first and third pulse amplifier circuits, said third diode connected serially with the first output of said second pulse amplifying circuit and the second output of said fourth pulse amplifying circuit, and said fourth diode also connected serially with the second output of said second pulse amplifying means and with the first output of said fourth pulse amplifying means, whereby the output voltage of said integrator circuit varies with the cross-correlation coefficient between said input waves.

14. Means for determining the cross-correlation coefficient between first and second pulsed input waves comprising first, second, third and fourth pulse amplifying means, means for connecting the injuts of said first and second pulse amplifying means to receive said first pulsed wave, means for connecting the inputs of said third and fourth pulse amplifying means to receive said second pulsed wave, each amplifying means providing first and second output pulsed waves, each having peak and base levels clamped to two predetermined voltage levels, and the first and second outputs of each of said amplifying means see-sawing between the two clamped voltage levels, an integrator circuit comprising a capacitor and a resistor connected in parallel, a direct-voltage source providing a voltage intermediate the clamped voltage levels and connected to one side of said integrator circuit, four pairs of equal-valued resistors, with each pair associated with a difference of said amplifying means, each pair of resistors having an end of each resistor respectively connected to the outputs of its associated amplifying means, first and second current-limiting resistors, each having one end connected to the other side of said integrator circuit, first and second diodes each having one side connected to the other end of said first current-limiting resistor, said first diode having its other end connected to the remaining ends of the resistors of said pairs connected to the first outputs of said first and third amplifying means, the other side of said second diode connected to the remaining ends of the second resistors of the pairs connected to the second outputs of said first and third amplifying means, third and fourth diodes connected on one side to the other end of said second current-limiting resistor with a polarity opposite from the polarity of said first and second diodes with respect to said integrator circuit, said third diode having its other side connected to the remaining end of resistor which is connected to the first output of said second amplifying means and also connected to the remaining end of the resistor connected to the second output of the fourth amplifying means, and said fourth diode being connected on its other side to the remaining end of the resistor connected to the second output of said second amplifying means and also connected to the remaining end of the resistor connected to the first output of said fourth amplifying means, whereby the charged voltage of said integrator circuit varies with the cross-correlation coefficient between said pulsed input waves.

References Cited in the file of this patent

UNITED STATES PATENTS

| | | |
|---|---|---|
| 2,225,346 | La Pierre | Dec. 17, 1940 |
| 2,525,448 | Clarke | Oct. 10, 1950 |

UNITED STATES PATENT OFFICE

CERTIFICATE OF CORRECTION

Patent No. 2,800,583　　　　　　　　　　　　　　　　July 23, 1957

Irvin H. Gerks

It is hereby certified that error appears in the printed specification of the above numbered patent requiring correction and that the said Letters Patent should read as corrected below.

Column 12, line 35, for "output" read --input--;　column 15, line 36, for "injuts" read --inputs--;　column 16, line 7, for "difference" read --different--.

Signed and sealed this 22nd day of October 1957.

(SEAL)
Attest:
KARL H. AXLINE

Attesting Officer

ROBERT C. WATSON
Commissioner of Patents